US005698002A

United States Patent [19]
Hudson

[11] Patent Number: 5,698,002
[45] Date of Patent: Dec. 16, 1997

[54] CONTROLLED RELEASE FERTILIZERS UTILIZING AN EPOXY POLYMER PRIMER COAT AND METHODS OF PRODUCTION

[75] Inventor: Alice P. Hudson, Jupiter, Fla.

[73] Assignee: Lesco Inc., Rocky River, Ohio

[21] Appl. No.: 342,808

[22] Filed: Nov. 21, 1994

[51] Int. Cl.$^6$ .............................. C05C 9/00; C05G 3/10
[52] U.S. Cl. ........................ 71/28; 71/64.02; 71/64.07; 71/64.11; 71/64.13
[58] Field of Search ................ 71/64.02, 64.11, 71/64.13, 28–30, 64.07

[56] References Cited

U.S. PATENT DOCUMENTS

| | | | |
|---|---|---|---|
| 3,223,518 | 12/1965 | Hansen | 71/11 |
| 3,264,088 | 8/1966 | Hansen | 71/64.07 |
| 3,475,154 | 10/1969 | Kato | 71/64.07 |
| 5,264,019 | 11/1993 | Gossett, Jr. et al. | 71/64.1 |

FOREIGN PATENT DOCUMENTS

| | | | |
|---|---|---|---|
| 0305918 | 8/1988 | European Pat. Off. | 71/64.13 |
| 066260 | 5/1979 | Japan | 71/64.11 |

*Primary Examiner*—Ferris Lander

[57] ABSTRACT

Controlled release, particulate fertilizer products having a water soluble fertilizer central mass encased in a plurality of water insoluble, abrasion resistant coatings plus coating compositions and methods for the production of such products are disclosed. At least one essential inner coating is an epoxide reaction product of A. at least one epoxide resin containing at least about 2 epoxide moieties per molecule, and B. at least one amine curing agent containing at least about two N—H moieties/molecule.

18 Claims, No Drawings

5,698,002

CONTROLLED RELEASE FERTILIZERS UTILIZING AN EPOXY POLYMER PRIMER COAT AND METHODS OF PRODUCTION

BACKGROUND OF THE INVENTION

1. Field of the Invention

This application relates broadly to plant food particles and to methods and compositions for their production. More particularly, it concerns controlled release, particulate fertilizer products comprising a water soluble fertilizer core encased in a plurality of water insoluble, abrasion resistant coatings and unique coating compositions and methods for the production of such products.

2. Description of the Prior Art

Commercial particulate fertilizers are produced and marketed in several different particle types, i.e., granular, pelletized and prilled fertilizers. Also they may be formed of inorganic substances, organic substances, or combinations thereof. The improvements of this invention can be applied to any of these.

To be effective in promoting plant growth, fertilizers must contain some amount of water soluble plant nutrients, typically in the form of water soluble compounds of nitrogen, phosphorus and potassium, alone or in combination, and often in conjunction with other elements, e.g., calcium, boron, magnesium, zinc, iron, manganese, chlorine, etc. Such particulate fertilizers can be made of a single component, e.g., urea, ammonium nitrate, potassium chloride, etc., or of multiple components often mixed with inert water soluble or water insoluble materials as in common fertilizers designated 6-6-6, 4-6-4, 10-10-10, 20-20-5, 14-16-0, 5-20-20 and the like. In addition, specialized fertilizers may contain optional additives such as herbicides, insecticides, trace elements, iron salts, etc. The improvements of this invention can be applied to any of these.

Historically, particulate fertilizers possessed a number of known defects, the most notable being the rapid release of soluble plant food, causing phytotoxicity and the rapid depletion of the nutrients by leaching. Other problems included tendencies to cake and form dust. The present invention provides improvements in the construction of particulate fertilizers that render them non-dusting and non-caking, highly attrition resistant, and noteworthy in extended release properties.

A number of slow release coatings for particulate fertilizers have been proposed. The process of sulfur coating urea particles is described in U.S. Pat. No. 3,342,577 and was developed in 1968 by the Tennessee Valley Authority (TVA) as an economical system for reducing the rate of dissolution when urea particles are applied to the soil as fertilizer. This process requires high levels of sulfur, which reduces the nutrient analysis of the fertilizer particles, and even then imperfections remain in the coating making it necessary to apply a sealant coating, historically a mixture of 30% polyethylene resin in 70% bright stock mineral oil, which also requires a particulate conditioner to render the fertilizer particles free flowing.

Coatings in which preformed polymer resins are applied from solvents have been proposed in, for example, U.S. Pat. Nos. 3,475,154 and 3,264,089. The use of solvents creates a vapor hazard as the products are dried and the solvent evaporation step can cause pinhole imperfections in the coatings when applied.

In situ reacted epoxides as slow release coatings are disclosed in U.S. Pat. No. 3,264,088. These compositions require at least 2, and preferably many more applications of epoxide layers, with each layer requiring a 10 to 20 minute cure time, thus making the manufacture of slow release fertilizers according to these teachings impracticably slow. U.S. Pat. No. 3,259,482 discloses epoxide resins which are reaction products of an epoxide component and a polyester resin, which are applied from solvent.

An additional problem encountered with coated urea products is the reduction or loss in water insoluble nitrogen (WIN) which occurs due to abrasion encountered in modern high speed blending and bagging operations. Urea and blended fertilizers when they are mixed and bagged must be labeled with their WIN content, and it is the responsibility of the manufacturer to assure that the value does not decrease below the labeled value during shipping and storage. Thus, a significant loss in WIN resulting from handling in modern high speed equipment can create a situation in which the fertilizer is mislabeled and subject to recall. The present invention makes it possible for fertilizer manufacturers to produce bagged particulate fertilizers that maintain their WIN content during shipping and storage. The present invention also reduces the attrition of the fertilizer particles caused by abrasion in the spreading operation.

OBJECTS

A principal object of the invention is the provision of improved plant food particles and new methods and compositions for their production.

Further objects include the provision of:

1. Particulate fertilizer products comprising a water soluble fertilizer core encased in a plurality of water insoluble, abrasion resistant coatings that give these new products special controlled release properties.

2. Unique coating compositions and methods for the production of such products that do not require the use of organic solvents.

3. New coatings for particulate fertilizer products which will act to give them high water insoluble nitrogen (WIN) values and cause them to release their plant nutrients to the soil at a slow, uniform rate over an extended period of time.

4. Such coatings that can be used at low weight ratios to the fertilizer to produce coated fertilizer compositions wherein the percentage of nutrients in the total composition is not significantly decreased by the addition of the coating material.

5. Fertilizer coatings that can readily be applied to fertilizer particles in a liquid form and become non-tacky and free flowing in a short period of time when reacted and cooled to ambient temperatures.

6. New coatings for fertilizers that provide high WIN values which are not significantly decreased by abrasion encountered in shipping, mixing, bagging, and storage.

Other objects and further scope of applicability of the present invention will become apparent from the detailed description given herein; it should be understood however that the detailed descriptions, while indicating preferred embodiments of the invention, are given by way of illustration only, since various changes and modifications within the spirit and scope of the invention will become apparent from such descriptions.

SUMMARY OF THE INVENTION

Throughout the following descriptions of this invention and the appended claims, all parts are by weight and all percentages of component are by weight based upon the total weight of the product containing a stated component.

The objects are accomplished, in part, in accordance with the invention by the provision of new particulate fertilizer products having high attrition resistance and controlled release properties. Such new fertilizers have a central mass of particulate fertilizer containing at least one water soluble plant nutrient surrounded by a plurality of coatings. One of the coatings is an inner coating applied directly to the fertilizer particle which functions as a primer coat and comprises a reaction product of A. at least one epoxide resin containing at least about 2 epoxide moieties per molecule; and B. at least one amine curing agent containing at least about 2 N—H moieties/molecule.

The epoxy polymer primer layer is coated with at least one and preferably more than one additional coatings which may be composed of:

additional epoxy polymers, in situ reacted polymers, thermoplastic polymers, and wax compositions.

A wax sealant coating is usually applied as the outermost coating, and preferably an additional polymer coating is interspersed between the epoxy polymer primer coat and the wax sealant coat. A preferred composition contains an epoxy polymer primer coat, at least one additional polymer coat and a wax sealant coat. In the most preferred composition the additional polymer coats are epoxy polymers.

Advantageously, the combined weight of the primer coat reaction product, the optional additional polymer coatings and the optional wax sealant layer constitute between about 1 and 20% by weight of the weight of the fertilizer, and the epoxy polymer primer constitutes between about 5 and 70% of the total weight of all of the coating materials; the additional polymer coats constitute between about 0 and 90%, and preferably between about 15 and 70% of the total weight of all the coatings; and the wax sealant constitutes between about 0 and 70% and preferably between about 10 and 70% of the total weight of all the coatings.

The objects are further accomplished by the provision of new methods for production of an attrition resistant, controlled release particulate fertilizer.

Such methods comprise the steps of (a) providing a quantity of fertilizer particles and heating them, (b) agitating the fertilizer particles such that a gentle mixing thereof is maintained, (c) adding to the agitated fertilizer particles separately or together the epoxide resin and the amine curing agent (d) allowing the epoxide resin and the amine curing agent to react forming a solidified epoxy polymer coating on the fertilizer particles, (e) adding to the epoxy polymer coated fertilizer particles at least one and preferably more than one additional coat which may be another of the epoxy polymer layers of the invention, an in situ reacted polymer, a thermoplastic polymer, or a wax composition, and (g) cooling the coated fertilizer particles with continuous agitation to below the melting point of any thermoplastic polymer or wax composition applied.

Successful application of the coatings of the invention to the particulate fertilizers depends on (1) precise temperature control, particularly for the epoxy polymer primer coat, and other epoxy polymer coats, (2) continuous non-shear movement of fertilizer particles during application of the inner epoxy polymer coatings and other polymer coatings, and (3) applying the wax overcoating with a minimum of mixing followed by cooling with minimal abrasion, as for instance that achieved in a fluid bed cooler.

DESCRIPTION OF THE PREFERRED EMBODIMENT

A more complete understanding of the invention can be obtained by reference to preferred embodiments of the invention which are illustrated by the following specific examples of the new products and methods of the invention. It will be apparent to those skilled in the art that the examples involve use of some materials and reagents that are commercially available from known sources, e.g., chemical supply houses, so details respecting them need not be given.

The epoxy resins of this invention contain at least about two epoxide moieties per molecule, and are standard items of commerce. Examples include:

the diglycidyl ether of 1,4 butanediol, the diglycidyl ether of neopentyl glycol, the diglycidyl ether of cyclohexanedimethanol, the diglycidyl ether of resorcinol, the diglycidyl ether of methylene bisphenol.

A preferred structure is bisphenol A diglycidyl ether, which is the reaction product of bisphenol A and 2 moles of epichlorohydrin. This is a standard item of commerce and is sold under the trade names:

DER-330 and DER-331 from Dow Chemical Company, Midland Mich. EPON 826 and 828 from Shell Chemical Company, Houston, Tex. EPI-REZ 509 and 510 from Interez, Inc., Louisville, Ky. Araldite 6010 from Ciba Geigy, Hawthorne, N.Y. Epotuf 37-139 from Reichhold Chemical Company, Research Triangle Park, N.C.

The resins as sold contain a minor amount of higher homologs. The average number of monomer units in the available commercial products is in the range of 1.0 to 1.2. Epoxy resins with lower amounts of polymeric material are preferred because of their lower viscosity which allows them to flow over the fertilizer particles and coat more rapidly and evenly.

The amine curing agents of this invention contain at least about 2 N—H moieties and are standard items of commerce. Examples include:

Polyoxyalkylene amines, such as those sold by Huntsman Chemical Company, Houston, Tex., under the tradename Jeffamine. Examples are:

Jeffamines D-230, D-400, and D-2000, which are polypropylene glycol diamines of molecular weight 230, 400, and 2000 respectively;

Jeffamines T-403, T-3000 and T-5000 which are glycol triamines of molecular weight 440, 3000, and 5000 respectively; and Jeffamines ED-600, ED-900, ED-2001, ED-4000, ED-6000, which are diamines of predominantly polyethylene glycol, of molecular weights 600, 900, 2000, 4000, and 6000 respectively.

Also included are low molecular weight amines which are highly reactive and are used primarily as accelerators. Examples are:

Jeffamine EDR-148 which is triethylene glycol diamine;

Isophorone diamine and 2,2,4-trimethyl-1,6-hexanediamine sold by Huls Chemicals, Marl, Ger.;

Diethylene triamine (DETA), triethylene tetramine (TETA), and tetraethylene pentamine(TEPA), sold by Dow Chemical Company; and N-2-aminoethylpiperazine, sold by Huntsman Chemicals.

Preferred are amines which possess at least one alkyl or alkylene moiety containing about 10 to about 22 carbon atoms. The alkyl or alkylene moieties of the preferred amines give the resulting uncured epoxide resin-amine curing agent mixture a low surface free energy which allows for excellent wetting and adhesion on the fertilizer particles. Examples of these amines include:

1. R—NH$_2$
   wherein R is chosen from
   a. aliphatic hydrocarbons containing from about 10 to about 22 carbon atoms. They can be saturated or unsaturated, and can be branched or straight chain. Examples include laurylamine, myristylamine, cetylamine, and stearyl amine. In preferred compositions R is saturated straight chain hydrocarbon containing about 16 to about 18 carbon atoms. Especially preferred is hydrogenated tallow amine, which is a mixture of predominantly cetyl and stearyl amine.
   b. R'—O—CH$_2$CH$_2$CH$_2$, wherein R' is aliphatic hydrocarbon containing about 10 to about 22 carbon atoms. It can be saturated or unsaturated and can be branched or straight chain.
   c. R"—NH—CH$_2$CH$_2$CH$_2$, wherein R" is an aliphatic hydrocarbon containing about 10 to about 22 carbon atoms. It can be saturated or unsaturated and can be branched or straight chain.

2.
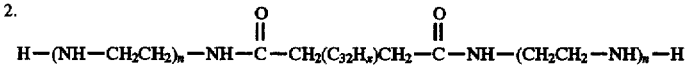

wherein n is about 0 to 3, and x is about 60. These are the reaction products of "dimer" acids and polyalkylene polyamines.

Dimer acids are formed from the dimerization of C$_{18}$ unsaturated fatty acids. The molecular structure of the dimer acids is not precisely known, and probably includes some ring structures and carbon-carbon single bonds. It also contains minor amounts of monomer, and of trimer and higher homologs.

Preferred polyalkylene polyamines are ethylene diamine, diethylene triamine, triethylene tetramine, and tetraethylene pentamine. Most preferred is triethylene tetramine.

The condensation of dimer acid and the polyamine, in addition to producing the aminoamide structure shown above, also produces a minor amount of the imidazoline structure.

The dimer acid-polyalkylene polyamine condensates are commercial products sold under the following trade names:

Versamid 115, 125 and 140, sold by Henkel Corporation, Minneapolis, Minn.;

AZamid 215, 325, and 340, sold by AZ Products, Atlanta, Ga.

Epi-Cure 8515, 8525, and 8540, sold by Interez, Inc., Louisville, Ky.;

Araldite Hardener 815, 825, and 840, sold by Ciba-Giegy Corporation, Hawthorne, N.Y.;

Epon V-15, V-25 and V-40, sold by Shell Chemical Company,Houston, Tex.

Amines with the structures identified in paragraph 2 above are more preferred. Most preferred is Versamid 140, which is a reaction product of dimer acid and triethylene tetramine and has an equivalent weight per N—H moiety of about 125.

It is understood that minor amounts of other components well known in epoxide formulations may be included in the epoxide compositions of this invention. These include but are not limited to:

low molecular weight polyamines such as 2-aminoethylpiperazine and isophorone diamine which may be added to accelerate the cure;

monoglycidyl ethers of aliphatic alcohols which may be added to reduce the viscosity of the epoxy resins; and catalysts such as boron compounds or tertiary amines which increase the reaction rate or decrease the optimum reaction temperature.

The epoxide resin and the amine curing agent are applied at a ratio such that the number of equivalents of epoxide per equivalent of hydrogen atoms bonded to amino nitrogen atoms is between about 0.5 and 2, preferably between about 0.8 and 1.2, and most preferably is about 1.

The level of epoxy polymer primer coating applied is a function of the nature of the substrate surface and the slow release properties desired, and can be from about 0.25% to 14.5%, based on the weight of the fertilizer particles.

The addition of more than one polymer coating is advantageous because it further enhances the slow release properties of the coated fertilizers by covering small imperfections in the initial coating layers. The additional polymers are chosen from those which possess the following characteristics:

They must adhere to the epoxy polymer primer;

They must be water insoluble and form a water impermeable or slowly permeable film;

They must be applicable to the epoxy polymer coated fertilizer particles without the use of solvents.

They must be applicable to the epoxy polymer coated fertilizer particles at temperatures which do not melt or otherwise destroy the fertilizer particle or other coating layers;

They must form films on the fertilizer particle in a short period of time, preferably less than 12 minutes and most preferably less than 6 minutes, so that the manufacturing process is not protracted; and They must form films that are not tacky and do not flow at temperatures up to about 40° C.

The additional polymer layers may be composed of

Additional in situ reacted epoxy polymers chosen from the compositions above described;

Insitu reacted urethane polymers which are reaction products of polyols and isocyanate resins, chosen from those systems which cure in a short period of time at temperatures that do not damage other components, which do not require the use of solvents, and which do not generate foam; and Thermoplastic polymers which may be a. resins such as polyolefins and olefin copolymers, or polyalkyl acrylate polymers and copolymers which will adequately flow and spread on the surface of the fertilizer particles without the use of solvents at temperatures which do not damage other components, and are non-flowing and not tacky at temperatures under about 40° C., or b. water dispersed latexes such as vinyl chloride polymers and copolymers, vinylidene chloride polymers and copolymers, or styrene-butadiene polymers which have minimum film forming temperatures, defined as the minimum temperature at which the individual particles in the latex coalesce to a film as the water is removed by evaporation, which can be achieved without damaging other components.

The organic wax which may be used as a sealant layer over the polymer layers is chosen from those which have drop melting points below the melting point of the fertilizer core and any thermoplastic polymer materials in the polymer coats. They must be non-tacky at temperatures below about 40° C., and preferably below about 50° C. They must possess low melt viscosity to allow for good flowability on the fertilizer particles.

Suitable waxes include paraffins; vegetable waxes such as montan and carnauba waxes; triglycerides such as hydrogenated tallow and hydrogenated vegetable oils; microcrystalline waxes; olefins; and polyethylene. A preferred wax is $C_{30}$ + alpha olefin, which is available as Gulftene 30+ from Chevron Chemicals, Houston, Tex. This is a synthetic wax made by the polymerization of ethylene. Such waxes advantageously used in the invention are the residues from the production of alpha olefins containing up to about 28 carbon atoms, from which most of the olefins up to about 28 carbon atoms are removed. A typical composition for such a wax is described by the size of the hydrocarbon wax molecules and the position of the olefin moiety. Waxes most useful in this invention have about 3 to 30 weight % $C_{24-28}$ hydrocarbons, about 60 to 95 weight % $C_{30-56}$ hydrocarbons and 0 to about 20 weight % $C_{58}$ and higher hydrocarbons. They consist of about 0.5 to 2 weight % paraffins (with no unsaturation), about 30 to 40 weight % hydrocarbons with vinylidene double bonds and about 50 to 55 weight % hydrocarbons with alpha double bonds. The congealing point is about 70° C.

The waxes may be modified by methods known in the art, such as the addition of polymers to increase abrasion resistance, the addition of dyes, and the addition of other known adjuvants.

The level of wax overcoat applied is from about 0.5% to about 10%, preferably from about 1% to 6%, based on the weight of the fertilizer particles.

In a preferred embodiment the epoxide resin is bis phenol A diglycidyl ether, which constitutes between about 0.25 and 12 percent of the weight of the fertilizer particles; the amine curing agent is a reaction product of dimer acid and polyalkylene polyamine, which constitutes between about 0.2 and 8 percent of the weight of the fertilizer particles; and the wax sealant is $C_{30+}$ alpha olefin, which constitutes between about 0.2 and 10% by weight of the weight of the fertilizer particles.

Other adjuvants which are commonly added to fertilizer compositions, such as inorganic nutrient particles, pesticides, and dyes may be added to the compositions of this invention. While they may be added at any point in the particle manufacture or coating process they are preferably added in the wax sealant step, either premixed with the molten wax, added at the same time as the wax is added to the fertilizer particles, or added as a separate step after the manufacture of the coated particle is complete.

The inner primer epoxy polymer coating is applied to the fertilizer prills or granules preheated to a temperature which (1) optimizes the moisture barrier properties of the resulting cured epoxy polymer, as determined by placing the coated fertilizer in water and observing the amount of water soluble fertilizer that leaches from the particles, (2) does not melt or otherwise damage the fertilizer particle being coated, and (3) allows the epoxy polymer to cure in a short period of time, preferably less than about 12 minutes and more preferably in less than about 6 minutes. This temperature is usually between about 60° and 110° C. The optimum temperature depends on the particular epoxide resin and amine curing agent chosen, and to a lesser extent on the melting point of the fertilizer substrate, and must be controlled precisely to at least within about 5 degrees of this optimum temperature, and preferably within about 2 degrees of the optimum temperature. If the temperature is too high the slow release properties of the resulting product are poor probably because the cure is too rapid to allow the resin mixture to flow and evenly coat the fertilizer particles. If the temperature is too low, the cure is too slow to be practical. The particles are kept in continuous low shear, low impact, motion relative to each other by a mixing apparatus. Suitable mixing methods include fluid bed, rotating drum, pan pelletizer, and others which can provide a continuous, low shear motion. The temperature and agitation are maintained for a sufficient period to cause the epoxide resin to cure.

When the epoxy polymer primed particles are free flowing, additional polymer coats may be added. If additional epoxy polymer layers are desired, they are applied in the same manner as the primer coat. Other polymers are added as two component reactive systems in the case Of in situ reacted polyurethanes; as water born latexes in the case of polyvinylidene chloride, polyvinyl chloride, and styrenebutadiene rubber polymers, from which water is driven off preferably in a fluid bed dryer; and as molten liquids in the case of sufficiently low melting thermoplastic polymers such as polyalkyl acrylates, polyolefins, and olefin copolymers. When the polymer layers have been applied and cured, coalesced, or otherwise solidified, the molten wax sealant is applied and heat and agitation continued until the wax has formed a contiguous film on the coated particles, usually for about 0.5 to 2 minutes. The wax sealed particles are then cooled with agitation to prevent agglomeration until the temperature has reached a level at which the wax coating is non-tacky and the fertilizer particles are free flowing. A preferred method of cooling the wax coated particles is by discharge to a fluid bed cooler.

The following examples illustrate the practice of the invention. All parts are by weight unless otherwise indicated.

EXAMPLE 1

In this example, a 10 inch diameter stainless steel pan heated in a sand bath and stirred by gently hand mixing with a spatula was used to agitate fertilizer granules and mix them with selected reagents. A slow release fertilizer composition was produced by the following procedure: 200 g of urea granules with an average particle diameter of about 2 mm were charged to the pan and warmed to 95° C. 3.22 g of hydrogenated tallow amine were melted at 70° to 80° C., and 0.44 g of 2-aminoethyl piperazine and 6.34 g of bisphenol A diglycidyl ether (DER 330 from Dow Chemical Company) were mixed with the molten hydrogenated tallow amine and immediately added to the warmed urea granules. The contents of the pan were gently agitated at 95° C. for 5 minutes until the epoxide resin was cured and the particles were free flowing. At this point 5 g of molten C30+ alpha olefin were added and the contents stirred for about 1 minute, then cooled in an air stream with gentle agitation for about 3 minutes until the wax had solidified and the temperature of the particles was less than 40° C.

EXAMPLE 2

(Comparative)

The procedure of Example 1 was repeated, except that the C30+ alpha olefin sealant was not used.

The amount of water soluble fertilizer which leaches from the coated particles was determined as follows: 10 g of the test product were added to 90 g distilled water contained in a polyethylene bottle. After gently swirling the bottle, it was capped and allowed to stand undisturbed for 24 hours at the temperature of the test. Then the bottle was gently swirled again and the urea dissolved was determined from the refractive index of solution pipetted from the bottle. The dissolved urea was again determined after the bottle and contents had stood at the temperature of the test for 4 days and 7 days. The results of tests run at 25° C. are reported below as the percentage of the original urea released from the particles.

|  | % Release in 7 days |
|---|---|
| Example 1 | 33 |
| Example 2 | 100 |

Epoxide coated urea granules were prepared by the general procedure of Example 1, using 200 g of urea granules and a mixture of 2.4 g of DER 330 and 1.6 g of a reaction product of dimer acid and triethylene tetramine (Versamid 140 from Henkel Corporation). The temperature was maintained at 86°±2° C. throughout the epoxide cure. 2.0 g of the following waxes were added and the fertilizer particles were cooled as in Example 1, with the results noted:

|  |  | % of Urea Released in 7 days at 25° C. |
|---|---|---|
| Example 3 | No wax sealant | 100 |
| Example 4 | C30 + alpha olefin | 30 |
| Example 5 | Microcrystaline wax, mp 75C | 62 |
| Example 6 | Montan wax | 100 |
| Example 7 | Paraffin wax, mp 71C | 100 |

Using the apparatus and general procedure of Example 1, compositions were prepared with one or two applications of a mixture of DER 330 and Versamid 140 in a weight ratio of 3:2, allowing the first application to cure before the addition of the second application. The temperature was maintained at 86°±2° C. throughout the epoxide additions and cure. The wax was C30+ alpha olefin. Thus the following compositions were produced with the total epoxide added as a weight % of the fertilizer core, the number of epoxide additions, the total wax added as a weight % of the fertilizer core, and the slow release properties noted:

|  | Total epoxide, % of urea | Number of epoxide applications | Wax, % of urea | % of urea released in 7 days at 25° C. |
|---|---|---|---|---|
| Example 8 | 3.0 | 1 | 1.0 | 17 |
| Example 9 | 2.0 | 1 | 1.0 | 24 |
| Example 10 | 1.0 | 1 | 1.0 | 54 |
| Example 11 | 3.0 | 2 | 1.0 | 7 |
| Example 12 | 1.25 | 2 | 1.25 | 12 |
| Example 13 | 1.0 | 2 | 1.0 | 27 |
| Example 14 | 0.5 | 2 | 1.0 | 62 |

The abrasion resistance of fertilizer particles was measured by the following procedure. 30 g of the coated fertilizer was dropped 5 times through a 6 foot long 5 inch diameter PVC tube into a stainless steel container. The release rate of soluble nutrients was measured as described above and compared to the release rate of the particles prior to abrasion. The abrasion resistance is the difference in the release rates before and after the particles are abraded by the above procedure and the smaller differences between these two values indicates the more abrasion resistant compositions.

Epoxide coatings consisting of a 60:40 mixture of Epotuf 37-139 and Versamid 140 were applied to urea granules with an average particle diameter of about 2 mm and also to urea granules with an average particle diameter of about 1 mm by the general procedure of Example 1, maintaining the temperature of the particles at 88°±2° C. The wax sealant was C30+ alpha olefin. The release rates before and after abrasion by the above procedure were measured and are shown below, and compared to two products of commerce which are polymer coated SCU. The differences in the release rates, as % of the urea released, before and after abrasion of the polymer coated urea of this invention were between 14 and 22%; that of the polymer coated SCU samples were 42 and 47%.

|  | Total epoxide, % of urea | Number of epoxide applications | Wax, % of urea | % of urea released in 7 days at 25° C. |
|---|---|---|---|---|
| 2 mm diameter urea granules |  |  |  |  |
| Example 15 | 1.20 | 2 | 1.0 | 39 not abraded |
|  |  |  |  | 57 abraded |
| Example 16 | 1.24 | 2 | 1.5 | 19 not abraded |
|  |  |  |  | 41 abraded |
| Example 17 | 1.92 | 2 | 1.0 | 20 not abraded |
|  |  |  |  | 35 abraded |
| Example 18 | 2.24 | 3 | 1.0 | 13 not abraded |
|  |  |  |  | 27 abraded |
| 1 mm diameter urea granules |  |  |  |  |
| Example 19 | 2.22 | 2 | 1.5 | 22 not abraded |
|  |  |  |  | 43 abraded |
| Example 20 | 3.03 | 2 | 1.0 | 17 not abraded |
|  |  |  |  | 30 abraded |
| Example 21 | 1.92 | 3 | 1.0 | 25 not abraded |
|  |  |  |  | 38 abraded |
| Commercial polymer coated SCU #1 |  |  |  | 13 not abraded |
|  |  |  |  | 55 abraded |
| Commercial polymer coated SCU #2 |  |  |  | 34 not abraded |
|  |  |  |  | 81 abraded |

Epoxide coatings consisting of a 60:40 mixture of Epotuf 37-139 and Versamid 140 were applied in three coats to urea granules with an average particle diameter of about 0.5 mm by the general procedure of Example 1, maintaining the temperature of the particles as indicated below. The wax sealant was C30+ alpha olefin. Release rates were measured as above with the results noted.

|  | Total epoxide % of urea | Temperature of reaction | Wax, % of urea | % of urea released in 7 days at 25° C. |
|---|---|---|---|---|
| Example 22 | 3.0 | 87–91° C. | 4.0 | 41 |
| Example 23 | 3.0 | 91–95° C. | 4.0 | 55 |

The epoxy polymer cured at 91°–95° C. gave poorer results than that cured at 87°–91° C. A reaction temperature maintained at 83° to 87° C. gave a product with good slow release properties, but the cure required about 3 minutes longer than that of Example 22 and thus is less preferred.

The apparatus and procedure of Example 1 was used to prepare slow release fertilizers from fertilizer prills with a nutrient analysis of 15-15-15. The epoxide was a 60:40 mixture of DER-330 and Versamid 140. The temperature was maintained at 86°±2° C. throughout the epoxide additions and cure. C30+ was used as the wax sealant. The compositions prepared and the results obtained are as follows:

|  | Total epoxide % of fertilizer | Number of epoxide applications | Wax, % of fertilizer | % of fertilizer released in 7 days at 25° C. |
|---|---|---|---|---|
| Example 24 | 9.0 | 3 | 1.0 | 51 |
| Example 25 | 9.0 | 1 | 1.0 | 100 |
| Example 26 | 9.5 | 4 | 1.0 | 38 |
| Example 27 | 9.5 | 4 | 2.0 | 26 |

EXAMPLE 28

The fertilizer particles of this invention can also be produced in a batch process or in a continuous process in a rotating drum. The epoxide components are premixed immediately prior to addition to the preheated fertilizer particles. Thus 2270 g of urea granules with an average particle diameter of about 2 mm were heated to 87° C. in a steel drum with a diameter of 20 in and a length of 10 in, rotating at about 10 rpm. 11.4 g of a 60:40 mixture of Epotuf 37-139 and Versamid 140 were added and allowed to cure for 5 minutes, and a second addition of 11.4 g of the epoxide-amine mixture was added and cured for 5 minutes. The temperature of the coated urea granules was maintained at 87°±2° C. throughout the reaction. 34.1 g of C30+ alpha olefin were added and mixed for 1 minute at 87° C., and the fertilizer was discharged and cooled in an air stream with gentle stirring. The resulting slow release product had a 7 day release of 12%.

EXAMPLE 29

Using the rotating drum described in Example 27, 2270 g of urea particles with an average particle diameter of 0.5 mm, preheated to 87° C., were charged. 34.0 g of a 60:40 mixture of Epotuf 37-139 and Versamid 140 were added and allowed to cure for 5 minutes, and a second and third addition of 34.0 g of the epoxide-amine mixture were added and each cured for 5 minutes. The temperature of the coated urea granules was maintained at 87°±2° C. throughout the reaction. 45.4 g of C30+ alpha olefin were added and mixed for 1 minute at 87° C., then 136 g of a mixture of powdered manganese oxide and red iron oxide and an additional 113.5 g of C30+ alpha olefin were added and mixed for 2 minutes. The fertilizer was discharged and cooled in an air stream with gentle stirring. The resulting slow release product had a 7 day release of urea of less than 10%.

EXAMPLE 30

Using the apparatus and procedure described in Example 1, 250 g of urea granules with an average particle diameter of 2 mm were heated to 85° C. and 1.3 g of a mixture of 48 parts of Epotuf 37-139, 29 parts of Versamid 140, and 22 parts of Jeffamine D-2000 (polyoxypropylene diamine, mw 2000) were added with gentle agitation and allowed to cure for 5 minutes. An additional 1.3 g of the above described mixture were added with agitation and cured for 4 minutes. 2.85 g of molten C30+ alpha olefin were added and stirred for 1–2 minutes to coat the particles, and the coated particles were cooled to room temperature with gentle agitation. The resulting particles had a 7 day release at 25° C. of 28%.

In Examples 31–37, the slow release properties of fertilizers with a polyurethane primer coat were compared to the slow release properties of fertilizers with an epoxy polymer primer coat. The urethane polymer was a reaction product of 59 parts of hydrogenated castor oil and 41 parts of a polymeric diphenylmethane diisocyanate with an NCO content of 32% and a functionality of 2.3 (PAPI 2094 from Dow Chemical Company). It was applied by adding the molten hydrogenated castor oil to the fertilizer particles heated to about 95° C. and gently agitating to form a continuous film, then adding the diisocyanate component in two additions and continuing to agitate for about 4 minutes to mix the components and effect a cure, and to prevent the formation of agglomerates. The epoxy polymer was a reaction product of a 60:40 mixture of Epotuf 37-139 and Versamid 140, added to the fertilizer particles as a mixture of the components and cured for 4 to 5 minutes at 87°±2° C. The wax sealant is C30+ alpha olefin, applied molten to the fertilizer particles and cooled with gentle agitation to less than 50° C. Using the above described materials, the following fertilizers were prepared, using the apparatus described in Example 1. The percentages of the polymers are weight % of the fertilizer core.

EXAMPLE 31 (comparative)

| Substrate: | urea granules, 2 mm diameter |
|---|---|
| Primer coat: | 1.5% polyurethane |
| Second coat: | 1.5% polyurethane |
| Wax sealant: | 1.5% C30 + alpha olefin |
| % released in 7 days at 25° C. | 47% |

EXAMPLE 32

| Substrate: | urea granules, 2 mm diameter |
|---|---|
| Primer coat: | 1.5% epoxide polymer |
| Second coat: | 1.5% polyurethane |
| Wax sealant: | 1.2% C30 + alpha olefin |
| % released in 7 days at 25° C. | 3% |

EXAMPLE 33 (comparative)

| Substrate: | urea granules, 2 mm diameter |
|---|---|
| Primer coat: | 1.5% polyurethane |
| Second coat: | 1.5% epoxide polymer |
| Wax sealant: | 1.0% C30 + alpha olefin |
| % released in 7 days at 25° C. | 42% |

EXAMPLE 34 (comparative)

| Substrate: | urea granules 1 mm diameter |
|---|---|
| Primer coat: | 1.5% polyurethane |
| Second coat: | 1.5% polyurethane |
| Third coat: | 1.5% polyurethane |
| Fourth coat: | 1.5% polyurethane |
| Wax sealant: | 1.6% C30 + alpha olefin |
| % released in 7 days at 25° C. | 57% |

EXAMPLE 35

| Substrate: | urea granules 1 mm diameter |
|---|---|
| Primer coat: | 3% epoxy polymer |
| Second coat: | 1.5% polyurethane |
| Third coat: | 1.5% polyurethane |
| Wax sealant: | 1.5% C30 + alpha olefin |
| % released in 7 days at 25° C. | 8% |

EXAMPLE 36 (comparative)

| Substrate: | Ammonium sulfate granules 2 mm diam |
|---|---|
| Primer coat: | 1.5% polyurethane |
| Second coat: | 1.5% polyurethane |
| Wax sealant: | 1.5% C30 + alpha olefin |
| % released in 7 days at 25° C. | 100% |

EXAMPLE 37

| | |
|---|---|
| Substrate: | Ammonium sulfate granules 2 mm diam |
| Primer coat: | 1.5% epoxy polymer |
| Second coat: | 1.5% polyurethane |
| Wax sealant: | 1.5% C30 + alpha olefin |
| % released in 7 days at 25° C. | 20% |

In Examples 38 and 39, the apparatus described in Example 1 was used and 200 g of granular urea with an average particle diameter of 2 mm, heated to 87° C., was coated with 2.0 g of a 60:40 mixture of Epotuf 37-139 and Versamid 140, and allowed to cure for 4 to 5 minutes. The epoxy polymer coated particles were then coated with the polymers and by the methods described in the following examples.

EXAMPLE 38

To 200 g of epoxy primed urea granules warmed to 80° C. were added 4.0 g of a molten low mw polyalkylacrylate with a congealing point of 55° C. (Shellswin 11T, from which the toluene solvent had been previously removed by evaporation). The granules were agitated gently for 2 minutes to coat them completely with the molten polymer and the coated granules were cooled to 40° C. with gently stirring. The resulting fertilizer had a 7 day release of urea at 25C of 66%.

EXAMPLE 39

To 200 g of epoxy primed urea granules warmed to 105° C., 4.0 g of a low molecular weight ethylene vinyl acetate copolymer containing 13% by weight vinyl acetate (A-C 400 from Allied Signal) was added molten, and the mixture gently agitated until the viscous ethylene vinyl acetate copolymer was spread uniformly on the fertilizer granules. The coated fertilizer was cooled to 40C with gentle agitation to prevent the formation of agglomerated particles. The resulting fertilizer had a 7 day release of urea at 25° C. of 69%.

EXAMPLE 40

To prepare slow release fertilizers with an epoxy primer coat and one of more coat of a polyvinylidene chloride polymer or copolymer the following procedure is followed. The epoxy polymer primer coat is applied as described for Examples 38 and 39 above. 200 g of the epoxy polymer primed urea particles are transferred to a suitable laboratory scale fluid bed dryer. The incoming air temperature to the fluid bed is in the range of 30° to 60° C. with sufficient air flow to remove the water from the latex coating applied in less than about 12 minutes and preferably in less than about 6 minutes. About 2 to 15 g, depending on the slow release properties desired, of polymer solids of a suitable polyvinylidene chloride copolymer latex (for example, Daran SL-112 from W. R. Grace, Lexington, Me., which has a solids content of 54 weight %, and viscosity of 30 cps) is sprayed as fine droplets into the bottom of the fluid bed over a period of 5 to 10 minutes. Care must be exercised to maintain a fine spray of latex, and to control the temperature so that the polymer forms a film but does not become tacky. When the water has evaporated from the latex the coated fertilizer particles are cooled to less than 40° C. and discharged.

The embodiments of the invention in which an exclusive property or privilege is claimed are defined as follows:

1. An attrition resistant, controlled release particulate fertilizer prepared by the process which comprises the steps of:

providing a quantity of fertilizer particles and heating them;

coating said fertilizer particles with at least one coating application comprising a reaction product of:
A. at least one epoxide resin containing at least about 2 epoxide moieties per molecule, and
B. at least one amine curing agent containing at least about two N—H moieties per molecule;

allowing each coating of the epoxide resin and the amine curing agent to react forming a solidified epoxy polymer coating on the fertilizer particles; adding to the epoxide coated fertilizer particles at least one additional water insoluble coating capable of forming a substantially water impermeable film chosen from the group consisting of:
1. in situ reacted polymers other than epoxides,
2. thermoplastic polymers, and
3. wax compositions, to produce an outer coating thereon; and cooling the coated fertilizer particles to below the melting point of the outer coating material.

2. The fertilizer of claim 1 wherein the fertilizer is mixed with low shear agitation throughout the coating process.

3. The fertilizer of claim 1 wherein said plant nutrient is selected from the group consisting of water soluble compounds of nitrogen, phosphorus and potassium.

4. The fertilizer of claim 3 wherein said plant nutrient is urea.

5. The fertilizer of claim 1 wherein said additional coatings comprise at least one polymer chosen from the group consisting of in situ reacted polymers and thermoplastic polymers.

6. The fertilizer of claim 1 wherein said additional coatings comprise at least one wax composition.

7. The fertilizer of claim 6 wherein said wax is a C30+ alpha olefin.

8. The fertilizer of claim 1 wherein the amine curing agent contains at least one compound containing at least one alkyl moiety containing about 10 to about 22 carbon atoms.

9. The fertilizer of claim 8 wherein the amine curing agent is chosen from the group consisting of 1. R—NH$_2$ wherein R is at least one organic radical chosen from the group consisting of
   a. aliphatic hydrocarbon containing about 10 to about 22 carbon atoms,
   b. R'—O—CH$_2$CH$_2$CH$_2$, wherein R' is aliphatic hydrocarbon containing about 10 to about 22 carbon atoms,
   c. R"—NH—CH$_2$CH$_2$CH$_2$, wherein R" is aliphatic hydrocarbon containing about 10 to about 22 carbon atoms, 2.
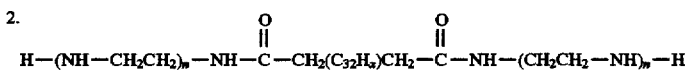

wherein n is about 0 to 3, and x is about 60.

10. The fertilizer of claim 9 wherein the epoxide resin contains at least about 2 glycidyl ether moieties.

11. The fertilizer of claim 9 wherein the epoxide resin is bis phenol A diglycidyl ether.

12. The fertilizer of claim 11 wherein the amine curing agent is a reaction product of dimer acid and polyalkylene polyamine.

13. The fertilizer of claim 12 wherein the epoxide coating is cured at temperatures between about 80° and about 95° C.

14. The fertilizer of claim 12 wherein the ratio of epoxide functionality to N—H functionality is about 1.

15. The fertilizer of claim 1 wherein the epoxide resin contains at least about 2 glycidyl ether moieties.

16. The fertilizer of claim 1 wherein the epoxide resin is bis phenol A diglycidyl ether.

17. The fertilizer of claim 1 wherein the combined weight of said reaction product and said additional coatings taken together constitute between about 1 and 20 percent by weight of the weight of said central mass.

18. The fertilizer of claim 1 wherein said reaction product constitutes between about 5 and 90 percent by weight of said combined weight of coating materials; said additional polymer coatings constitute between about 0 and 70 percent by weight of said combined weight of coating materials; and said wax composition constitutes between about 10 and 70 percent by weight of said combined weight of coating materials.

* * * * *